United States Patent Office 3,170,904
Patented Feb. 23, 1965

3,170,904
PRODUCTION OF CIS-1,4 POLYBUTADIENE WITH A Ni-BF$_3$·ETHERATE-AlR$_3$ CATALYST
Kenichi Ueda, Akira Onishi, and Toshio Yoshimoto, Tozuka-ku, Yokohama, Junichi Hosono, Kohoku-ku, Yokohama, and Katsuhiko Maeda, Tozuka-ku, Yokohama, Japan, assignors to Bridgestone Tire Company Limited, Tokyo, Japan
No Drawing. Filed Nov. 21, 1960, Ser. No. 70,408
Claims priority, application Japan, Nov. 28, 1959, 34/36,937; Dec. 31, 1959, 34/41,519; May 30, 1960, 35/25,674, 35/25,675; Oct. 4, 1960, 35/41,225
5 Claims. (Cl. 260—94.3)

This invention relates to a new method of manufacturing solid polymers of butadiene having a high content of cis-1,4-configuration, and more particularly to a method of polymerization using a novel active catalyst system well adapted for converting a butadiene monomer to a solid polymer of butadiene having a high content of cis-1,4-configuration.

At present, from the properties and economical points of view one of the synthetic rubbers which can be used for general purposes as substitutes of natural rubbers is polybutadiene having a high content of cis-1,4-configuration.

To find the suitable catalyst for manufacturing cis-1,4-polybutadiene, the present knowledge of ordinary or even stereospecific catalyst for polymerization of monoolefine is almost useless, because monoelefine can not polymerize in the form of 1,4-addition. Even from the knowledge of the catalyst for cis polyisoprene, the catalyst for cis polybutadiene is unexpectable, perhaps because isoprene monomer is more stable in cis-form but butadiene is more stable in trans-form.

For instance, triethylaluminum - titaniumtrichloride catalyst is suitable for manufacturing isotactic polypropylene and triethylaluminum-titaniumtetrachloride catalyst is suitable for manufacturing cis polyisoprene but both catalysts are unsuitable for manufacturing cis polybutadiene.

There are three known methods for manufacturing polybutadiene having a high content of cis-1,4-configuration as follows:

(1) Phillips Process, which is a polymerization process using catalyst consisting of trialkyl aluminum and titaniumtetraiodide.

(2) Hüls Process, which is a polymerization process using catalysts consisting of triisobutylaluminum and titaniumtetrabromide.

(3) Montecatini Process, which is a polymerization process using catalysts consisting of dialkylaluminumchloride and cobaltous chloride or the like.

The present invention is to provide a novel polymerization process well adapted for the manufacture of solid polybutadiene having a high molecular weight and a high content of cis-1,4-configuration which is at least 70%, usually between 90% and 95% and under suitable polymerization conditions above 95% by using new catalysts which are essentially different from the known methods even under the moderate polymerization condition of low temperature and low pressure.

The present invention also provides a method of manufacturing a new catalyst system having a high polymerization activity of cis-1,4-orientation, which is formed by the combination of three components A, B and C. The A component is a metal selected from the metals of groups VII–a and VIII of the Periodic Table, for instance, iron, nickel, cobalt, manganese, and platinum having a large surface area for its weight used in the form of colloid or fine powder of porous solids.

The B component is preferably boron trifluoride etherate.

The C component is a compound selected from the class consisting of the organometallic compounds of the metals of groups I, II, III and IV and the halogen-derivatives of a part of hydrocarbon residue of organometallic compounds of the metals of groups II, III and IV and the hydrides of the metals of groups I, II and II of the Periodic Table.

The inventors have continued a number of extensive researches for converting butadiene monomer into solid polymer having a high molecular weight and a high content of cis-1,4-configuration and have found many revelations as follows:

Firstly, they found that reduced nickel-diatomaceous earth alone made possible to convert butadiene into solid polymer of such properties;

Secondly, they found that two-component systems such as nickel-diatomaceous earth-triethylaluminum and Raney nickel-borontrifluoride ether complex had similar properties and advanced the polymerization activity.

At last, however, they found that three-component systems such as nickel-diatomaceous earth-borontrifluoride ether complex-triethylaluminum made possible the obtainment of extremely higher polymerization activity as well as higher molecular weight and cis-1,4-orientation than above one- and two-component systems and was unpredictable before this invention.

The present invention makes possible to provide polybutadiene containing 90 to 95% of cis-1,4-configuration usually more than 95% of it in using some representative catalyst-component combinations. This high cis-1,4 content is one of the important characteristics of this invention preferable to said two-component catalyst systems containing titanium halides. The two-component catalyst systems consisting of trialkyl aluminum and titaniumtetraiodide provide polybutadiene containing usually 90% and about 94% at most of cis-1,4-configuration and that consisting of triisobutylaluminum and titaniumtetrabromide provides 85% of cis-1,4-configuration at most.

The cis-1,4 orientating ability of the catalyst system of this invention is extremely strong in a wide range of composition and is not affected by changes of polymerization conditions such as temperature and existence of a small amount of impurities such as acetic acid, ethyl acetate and t-butyl-catechol. It is said in the past that the catalyst system consisting of cobaltous chloride and diethylaluminumchloride provides polybutadiene having more than 90% cis-1,4 content only when polymerized at a low temperature below 25° C. and its ability of cis-1,4-orientation decreases with increasing polymerization temperature and it gives polybutadiene having 83.5% cis-1,4 content at 40° C. for example. The catalyst system of this inveniton provides polybutadiene having more than 95% cis-1,4 content even at more than 40° C. This fact means that the catalyst of this inveniton does not need severe control of polymerization temperature to obtain high cis-1,4 polybutadiene. That is one of the important advantages of this invention.

The polybutadiene manufactured by some representative catalyst systems of this invention does not contain gel usually even when butadiene is polymerized under the conditions such as temperature between 0° C. and 70° C., no solvent and high conversion.

The A component, that is, a metal belonging to groups VII–a or VIII of the Periodic Table and having a large surface area for the weight and used in the form of colloid, fine powder or porous solids, is selected from reduced metals adhered to or not adhered to carriers and Raney-type metals.

They are such as reduced nickel, reduced iron, reduced cobalt, reduced manganese and reduced platinum which are adhered to or not adhered to a carrier, Raney nickel, Raney iron, Raney cobalt and a reduced or a Raney metal which is a composition of more than two metals selected from VII–a and VIII groups.

The A component having a comparatively large surface area for its weight can be manufactured by various known methods. One method of manufacturing the reduced metals above mentioned is to reduce their oxides, hydroxides or salts adhered to or not adhered to carriers by hydrogen, carbon monoxide or the like reducing gases in the range of temperature in which the reduction is possible and the sintering of reduced metal is prevented, usually in the range of 150° to 600° C. The salts used are salts of inorganic acids such as nitric, sulfuric and carbonic acid and salts of organic acids such as formic, oxalic and citric acid and the like acids. In the case of using nickel formate, nickel oxalate or nickel tetracarbonyl the catalytically active colloidal nickel may be obtained by their thermal decomposition in vacuo or inert medium instead of the reduction.

Other forms of the reduced metal above mentioned may be obtained by contacting easily reducible anhydrous salts of said metals dissolved in inert medium or dispersed as fine powders therein with reducing agents such as organometallic compounds of alkali metals, magnesium, cadmium, zinc, aluminum and the like powerful reducing agents. In this case, if necessary, it is preferable to heat the mixture up to a suitable temperature to accelerate the reduction; that is, for example, no appreciable change does occur at 20° C. by dispersing nickel carbonate-diatomaceous earth powders in benzene solution of triethylaluminum, but if the mixture is heated to 40° C. for 1 hour the original greenish yellow powders are converted to black coloured reduced nickel-diatomaceous earth. Said metal salts of higher organic acid such as nickel naphthenate, nickel stearate and cobalt octanoate soluble in benzene are contacted with a benzene solution of triethylaluminum, then they are reduced at once at room temperature and form black coloured nickel colloid.

It is preferable to react a metal salt with an organometallic compound sufficiently to complete its reduction. It is more preferable to use the reduced metal after the separation from the reaction mixture to increase the cis-1,4 content of produced polymer. It is most preferable to use hydrogen gas as the reducing agent.

The said metal oxide, hydroxide or salt adhered to carrier can be prepared by a known method of co-precipitation or impregnation and the like. The carrier used in this invention is a porous solid having a desired surface area such as diatomaceous earth, silica-alumina, silica, titania, zirconia, active clay, kaolin or a solid having such composition.

The Raney iron, nickel or cobalt used in this invention means metallic iron, nickel or cobalt obtained by subjecting alkali or acid treatment or vacuum evaporation and the like operation to the alloys (powder or grain) which consist of one or more metals of iron, nickel and cobalt and a metal selected from aluminum, silicon, zinc, magnesium and mercury which can be eliminated by alkali or acid treatment or by vacuum evaporation. The treatment of alloy should be effected by preventing the surface of catalyst from contacting with air and it should be stored in anhydrous inert solvents. The iron, nickel or cobalt content in the alloy is not limited specially, but it is preferable in the range of about 20 to about 60%. Raney iron-nickel prepared from an iron-nickel-aluminum alloy containing nickel in a range of trace to about 20% is also preferable as an A component of the catalyst system. The above Raney alloy may be manufactured conveniently with addition of a small amount of copper, chromium, molybdenum, vanadium or tungsten.

The A component of the present catalyst is not always pyrophoric as shown in later specific examples. The activity of the A component and its pyrophoric property do not go together in this invention.

The B component of the catalyst system is a compound selected from the class consisting of (1) Halides of boron, titanium, zirconium, and vanadium, for instance, borontrifluoride, borontrifluoride ether complex, borontrichloride, borontribromide, other complexes of borontrifluoride, titaniumtetrachloride, titaniumtetrabromide, titaniumtetrachloride ether complex, titaniumtrichloride, zirconiumtetrachloride and vanadiumtetrachloride and (2) Oxyhalides of the metals of groups IV–a and V–a of the Periodic Table, for instance, zirconiumoxychloride and vanadiumoxychloride and (3) Alkoxy-derivatives of a part of halogen atoms of the halides of the metals of group IV–a of the Periodic Table, for instance, titaniumdibutoxydichloride. Said complexes of borontrifluoride are complexes of borontrifluoride and ether, acid, alcohol, phenol or ester, for instance, dioxane, acetic acid, methanol, phenol and ethyl acetate.

Among these compounds titaniumtetrachloride, borontrifluoride or its complex is preferable. But borontrifluoride or its ether complex is most preferable as a B component in veiw of a polymerization activity, cis-1,4-orientation and molecular weight and gel content of polymer obtained.

The C component of the catalyst system is a compound selected from the class consisting of (1) Organometallic compounds having more than one alkyl group, aryl group, aralkyl group or cycloalkyl group directly combined with the metals of groups I, II, III and IV of the Periodic Table, for example, butyllithium, amylsodium, amylpotassium, diethylcadmium, diethylzinc, diethylmagnesium, triethylaluminum, triisobutylaluminum, triethylboron, lithiumaluminumtetrabutyl and tetrabutyltin and (2) Organometal halides of the metals of groups II, III and IV of the Periodic Table, for example, ethylmagnesiumbromide, phenylmagnesiumbromide, diethylaluminumchloride, ethylaluminumdichloride, diethylboronchloride and tributyltinchloride and (3) Hydrides of the metals of groups I, II and III of the Periodic Table, for example, sodiumhydride, lithiumhydride, calciumhydride, diborane and diethylaluminumhydride and lithiumaluminumhydride.

Among these compounds trialkyl-aluminums are preferable.

The catalyst system of this invention has the following characteristics as compared to known olefine catalysts.

(1) The A component of this catalyst system is in metallic state and therefore this catalyst system should not be included in a category of Ziegler-type catalyst comprising some compounds of transition metal.

(2) In spite of combining three-components A, B and C to increase the polymerization activity of the A component an original strong ability of cis-1,4-orientation of the A component does not fall at all but rises in some cases. The fact is an important feature of the catalyst of this invention.

(3) The catalyst system of this invention which is formed by combining C or B component to the two-component catalyst systems A–B or A–C respectively, has extremely increased polymerization activity as well as increased or retained ability of cis-1,4-orientation and also gives increased molecular weight against above two-component catalyst systems. The fact is a feature which can not be seen in the case of other former catalyst systems.

(4) Only when the three-components are combined "indispensably" the features of this catalyst system can be displayed.

The function of the components B and C of this invention is essentially different from the function of the complex compound formed by the B and C components only on the polymerization of butadiene. The polymerization of butadiene by the complex compounds formed by mixing the B and C components had already been investigated over a wide range (refer to, for instance, N. G. Gaylord, H. F. Mark, Linear and Stereoregular Addition Polymers, Interscience Publishers, (1959)). For instance, with titaniumtetrachloride-triethylaluminum, if Ti/Al is 0.5:1 to 1.5:1 mole ratio a mixture of cis-1,4 polybutadiene and trans-1,4 polybutadiene (the content of cis-1,4-configuration for the total polybutadiene is less than 70%) is obtained and if the ratio is 1.5:1 to 3:1, more particularly 2:1, the substantially all trans-1,4 polybutadiene is obtained. With a mixed catalyst of titaniumtrichloride, vanadiumtrichloride or vanadiumoxychloride and organometallic compounds of aluminum or zinc, trans-1,4-rich polybutadiene is obtained. In general, with the mixed catalyst of the chlorides of metals in groups IV-$a$ and V-$a$ of the Periodic Table and organometallic compounds, trans-1,4-rich polybutadiene is obtained more often, and with the mixed catalyst of the alkoxy-derivatives of the metal halides and organometallic compounds 1,2 polybutadiene is obtained more often, as is well known.

The polymerization of the method of this invention is based on the discovery that the metals of groups VII-$a$ and VIII of the Periodic Table having a large surface area for its weight have strong cis-1,4-orientation, independent of orientating properties of B-C complex. For instance, even if, B-C combination which has strong ability of trans-1,4-orientation is employed as the two-components in the method of this invention it serves mainly as the promoter only. However, the catalyst of this invention using reduced nickel-diatomaceous earth, titaniumtetrachloride and triethylaluminum as A, B and C respectively (mol ratio of $B/C$ is 1) provides polybutadiene having more than 90% cis-1,4 content.

An important factor governing the polymerization activity of the catalyst of this invention is the mole ratio of catalyst component $C/B$ which is usually within the range of about 0.1 to about 5 and preferably about 0.2 to about 1.3. The polymerization activity also varies with the ratio of $A/B$ or $A/C$, but it does not change so much. It is usually preferable to use about 0.1 to about 10 gram-atoms of A per mol of B component.

When the catalyst system of this invention is prepared it is necessary to make three-components react uniformly as possible by the operation of dissolving, dispersing, stirring or shaking. Further, if necessary, the heat treatment of catalyst component mixtures or the low-temperature preparation of catalyst system is employed in accordance with an individual component combination as shown in specific examples.

The activity of the catalyst system of this invention is concerned closely with the order of mixing the catalyst components, their reaction temperaure and their reaction time. The preferable preparation method of the active catalyst system is as follows: firstly, the A component is made to react with the B component sufficiently under the suitable condition and secondly, the C component is made to react with the above reaction product under the moderate reaction condition.

This shows that the catalyst system of this invention is not a simple mixture of three-components but a reaction product consisting of three-components which are combined indispensably. Various modifications as to the above method may be utilized for control of polymerization reaction.

This catalyst-forming reaction proceeds smoothly at a temperature generally between about —50° C. and about +70° C. and even below —50° C. in some cases.

The ratio of amount of the catalyst to that of butadiene is not specially limited in this invention. In the representative combination of the catalyst components only 0.1 gram-atom of the A component against 1 mole of butadiene monomer is sufficient to effect polymerization.

The preferable combinations of the catalyst components are as follows: reduced nickel-diatomaceous earth-borontrifluoride ether complex-triethylaluminum, reduced nickel-diatomaceous earth-titaniumtetrachloride-triethylaluminum, metallic nickel (prepared by thermal decomposition of nickel formate)-borontrifluoride ether complex-triethylaluminum, Raney nickel-borontrifluoride ether complex-triethylaluminum, Raney iron-borontrifluoride ether complex-triethylaluminum, Raney iron-borontrifluoride-triethylaluminum, Raney iron-nickel-borontrifluoride ether complex-triethylaluminum and Raney nickel-borontrifluoride ether complex-triethylboron.

The method of polymerization of this invention is characterized in that under the substantially anhydrous condition and in an inert gas atmosphere and at a temperature between about —50° C. and about +150° C., preferably between about —5° C. and about +70° C. and under a pressure under which butadiene is in liquid phase, butadiene is made to contact with a catalyst system consisting of said A, B and C components.

It is desriable to minimize the introduction of water, oxygen, alcohol and acid into contact with the catalyst, but the effect of these materials on the polymerization activity and cis-1,4 orientating activity of the catalyst system is not so sensitive as that of Ziegler-type catalyst.

Solvent is generally used to control the polymerization easily, but of course the polymerization can be effected without slovent. The amount of solvent to monomer is not so critical, but usually it is within about 40 times of monomer by volume.

Solvents are hydrocarbon or halogen substitutes thereof belonging to substantially dehydrated aromatic alicyclic or aliphatic group, as for instance, benzene, toluene, xylene, cyclohexane, heptane, pentane, petroleum ether, carbon tetrachloride, chlorbenzene or a mixture having such components. Among these, benzene, toluene or xylene is preferable. Instead of using slovents non-reacted butadiene may be used as a diluent.

In olefine polymerization it is known that a borontrihalide acts as a cocatalyst on a catalyst consisting of an organoaluminum compound and the halide of the metal belonging to group IV, V or VI of the Periodic Table. (Refer to U.S. Patent No. 2,922,782.) The catalyst system of this invention used in butadiene polymerization seems to bear some resemblance to the above catalyst system in the point of using a borontrihalide.

The catalyst system of this invention, however, is different from the said known catalyst system in three points (1) the latter does not contain a metal belonging to VIII group which is the A component of the former, and (2) in the latter a borontrihalide serves as a molecular weight-reducing agent by being added to a polymerization-active Ziegler-type catalyst, but in the former it is an indispensable component to form a polymerization-active catalyst and shows molecular weight-increasing effect, and (3) the quantity of a borontrihalide in both catalyst systems is considerably different from each other, i.e. in the latter trace to 1 mole, while in the former 0.2 to 10 moles per 1 mole of an organoaluminum compound.

The catalyst system of this invention has powerful polymerization activity so that the catalytic contact can be effected by any of various known methods, using catalyst, such as, stationary bed or movable bed catalyst, or suspension catalyst.

The reaction product of polymerization is usually perfectly dissolved in the solvent and solid parts of the catalyst precipitate gradually. In this case, the separation of polymer solution not containing solids can be easily done by means of a siphon or filtration. When, however, the viscosity of the solution is too high, more solvent should be added to the solution to lower the viscosity of the solution to a suitable value and solids should be completely separated by means of a siphon, filter or a centrifuge. The polymer solution perfectly deprived of solids is concentrated by vacuum evaporation at room temperature and after the solution has been sufficiently concentrated it is poured into a large amount of lower alcohol to decompose and eliminate the soluble part of the catalyst and at the same time to precipitate the polymer. In this case an antioxidant is mixed uniformly into the polymer, then the polymer is dried in vacuo at room temperature.

C. as toluene solution. The result of experiments is shown in the following:

| Test No. | Triethyl-aluminum (mmol.) | Al/Ti (mole ratio) | Polymer yield (gr.) | Intrinsic viscosity [η] | Microstructure (percent) | | |
|---|---|---|---|---|---|---|---|
| | | | | | cis-1,4 | trans-1,4 | Vinyl |
| 1 | 0 | | 1.0 | | 95 | 3 | 2 |
| 2 | 0.1 | 0.2 | 3.4 | 1.24 | 95 | 3 | 2 |
| 3 | 0.2 | 0.4 | 11.5 | 1.02 | 94 | 3 | 3 |
| 4 | 0.5 | 1.0 | 11.5 | 0.75 | 91 | 7 | 2 |
| 5 | 1.0 | 2.0 | 6.0 | 1.70 | 95 | 3 | 2 |
| 6 | 5.0 | 10.0 | 2.8 | | 53 | 28 | 19 |
| 7[1] | 1.0 | 2.0 | 0.03 | | 37 | 56 | 7 |

[1] Instead of nickel-diatomaceous earth, 5 gr. of the diatomaceous earth dried at 450° C. for 5 hours were used.

Butadiene polymers manufactured by the method of this invention are rubbery solids and they were analyzed according to the infrared spectroscopic analysis proposed by Morero (La Chimica e l'Industria, 41, 758 (1959)). When the intrinsic viscosity of these polymers is measured in a toluene solution at 25° C., it is usually in a range of 1.0 to 5.0. The gel content of these polymers is usually small when measured by filtering their toluene solutions with 200 meshes wire gauze, while it is substantially zero in the polymer obtained by a catalyst system containing a borontrifluoride ether complex as a B component.

*Example 1*

In the similar method to manufacture reduced nickel-diatomaceous earth catalyst used for ordinary hydrogenation reaction, basic nickel carbonate made from nickel sulfate and sodium carbonate was precipitated on diatomaceous earth and was molded to tablets and reduced by hydrogen to form nickel-diatomaceous earth containing 50% of nickel. It is once stabilized by a mixture of air and nitrogen and again reduced by hydrogen at 170° C.

While purified nitrogen gas was flushed into a pressure bottle of 280 ml., 10 gr. of nickel-diatomaceous earth, 40 ml. of refined benzene dried with metallic sodium, 0.5 mmol. of titaniumtetrachloride and 0.1 to 5 mmol. of triethylaluminum were supplied thereto successively in the above order and after the reaction bottle was cooled to —20° C., 25 ml. of liquefied butadiene, which had been dried with caustic potash and calcium chloride and further dehydrated by cooling to —78° C. were supplied thereto and the bottle was tightly sealed. After the bottle had been rotated for agitation for 3 hours at 40 r.p.m. in a thermostat at 40° C., then it was taken out and the unreacted butadiene was driven off. After 100 ml. of benzene were added to the bottle and it was well shaken and left in a short time, then a greater part of solids of the catalyst was precipitated. After suspended solids of the catalyst has been perfectly separated by a centrifuge the content of the bottle was poured into a large quantity of methanol containing antioxidant to precipitate the polymer and the precipitate was dried in vacuo at room temperature. The polymer thus obtained was a rubbery solid, of which the microstructure was analyzed and the intrinsic viscosity was measured at 25°

From the results of the above experiments it will be apparent that nickel-diatomaceous earth has a great effect on the orientating polymerization of cis-1,4-configuration and that when a proper amount of triethylaluminum and titaniumtetrachloride is used remarkable activation can be resulted and that when the mole ratio of Al/Ti arrives at 10 the cis-1,4-orientation disappears.

*Example 2*

As examples of the substance essentially consisting of nickel having a large surface area for the weight;

(1) Nickel carbonate made from nickel nitrate and sodium bicarbonate was precipitated on diatomaceous earth and once oxidized by the air at 350° C. and then reduced by hydrogen at 350° C. The powder of nickel-diatomaceous earth thus prepared was not pyrophoric and contained 50% of nickel, (2) Powdered nickel-diatomaceous earth manufactured by the same method as in (1) containing 10% of nickel was also not pyrophoric, (3) Powdered nickel-diatomaceous earth containing 1% of nickel manufactured by the same method as in (1) was still also not pyrophoric, (4) Reduced nickel powder without carrier manufactured by the same method as in (1) except without using diatomaceous earth, (5) Powder of nickel carbonate diatomaceous earth manufactured by the same manner as in (2) was dried for 5 hours at 110° C. and then 0.7 gr. of it was dispersed in 30 ml. of benzene and added with 4 mmol. of triethylaluminum and heated at 40° C. for 1 hour. The powder of nickel carbonate of yellowish green color changed to black reduced nickel by heating. To this solution was added 2 mmol. of titaniumtetrachloride to prepare the catalyst.

(6) 1 gr. of commercial nickel naphthenate (nickel content 8%) was dissolved in benzene and was added with 3 mmol. of triethylaluminum in benzene solution as reducing agent, then it was easily reduced at room temperature and black colored colloidal nickel was produced, and 3 mmol. of titaniumtetrachloride was added thereto to prepare the catalyst. In this case, triethylaluminum had been used both for reduction of nickel naphthenate and as a component of the catalyst of this invention.

The manner and condition of the polymerization, purification and analysis of the product were the same as in Example 1, unless especially defined.

| | Weight of Nickel Component, gr. | Titanium-tetra-chloride (mmol.) | Triethyl-aluminum (mmol.) | Polymer yield (gr.) | Polymerization time (min.) | Microstructure (percent) | | |
|---|---|---|---|---|---|---|---|---|
| | | | | | | cis-1,4 | trans-1,4 | Vinyl |
| (1) | 0.7 | 1.0 | 1.0 | 10.2 | 70 | 94 | 4 | 2 |
| (2) | 0.7 | 1.0 | 1.0 | 12.4 | 70 | 93 | 5 | 2 |
| (3) | 0.7 | 1.0 | 1.0 | 2.0 | 70 | 91 | 7 | 2 |
| (4) | 0.7 | 1.0 | 1.0 | 0.9 | 70 | 93 | 5 | 2 |
| (5) | 0.7 | 2.0 | 4.0 | 8.3 | 70 | 90 | 6 | 4 |
| (6) | 1.0 | 3.0 | 3.0 | [1] 10.5 | 70 | 95 | 3 | 2 |

[1] 20 ml. of liquified butadiene monomer were used.

Example 3

It is known that the complex compound made of vanadium oxychloride and triethylaluminum can polymerize butadiene to the all trans-1,4 polybutadiene, yet it can be used as a component of the catalyst in the method of this invention. Butadiene was polymerized under the same process as in Example 1 with the catalyst consisting of 1 mmol. of vanadium oxychloride, 1 mmol. of triethylaluminum and 0.7 gr. of nickel-diatomaceous earth (50% of nickel) same as (1) of Example 2. The polymerization time was 4 hours and yield of polymer 0.4 gr. The results of microstructure analysis of the polymer showed 92% cis-1,4, 7% trans-1,4 and 1% of vinyl configurations.

Example 4

The experiments were carried out by changing the order of contact among A, B and C components of catalyst system and butadiene monomer.

(1) To 0.8 gr. of nickel-diatomaceous earth containing 50% nickel prepared in the same manner as (1) of Example 2, while violently agitating, was added 1 mmol. of titaniumtetrachloride and 1 mmol. of triethylaluminum in this order to produce dark brown colored complex compound on the nickel-diatomaceous earth and after cooled to −20° C., 25 ml. of liquefied butadiene were added thereto and the polymerization was carried out.

(2) 0.8 gr. of the same nickel-diatomaceous earth as (1) is put in the benzene and after being cooled to −20° C., 25 ml. of butadiene were added thereto, and then an ampule containing the complex compound previously prepared by 1 mmol. of titaniumtetrachloride and 1 mmol. of triethylaluminum was put therein and crushed by shaking, and the complex compound was mixed with the above mixture to effect polymerization.

(3) Complex compound was prepared in a reaction vessel by 1 mmol. of titanium tetrachloride and 1 mmol. of triethylaluminum, and then 0.8 gr. of the same nickel-diatomaceous earth as (1) was added thereto and after being cooled to −20° C., 25 ml. of liquefied butadiene were added to effect polymerization. The time of polymerization was 70 minutes by revolving the vessel at 40 r.p.m. in a thermostat and all the other conditions were the same as in Example 1.

| Polymerization system | Polymer yield (gr.) | Microstructure (percent) | | | Intrinsic viscosity [η] |
|---|---|---|---|---|---|
| | | cis-1,4 | trans-1,4 | Vinyl | |
| (1) | 10.2 | 94 | 4 | 2 | 0.92 |
| (2) | 4.7 | 95 | 3 | 2 | 1.71 |
| (3) | 5.5 | 94 | 4 | 2 | 1.21 |

Example 5

40 ml. of purified benzene were put in a glass pressure bottle and 1 mmol. of titaniumtetrachloride and 1 mmol. of triethylaluminum were added thereto in the described order and after complex compound of dark brown color was produced the varying quantity of 0.2 to 4 gr. of nickel-diatomaceous earth containing 10% of nickel manufactured in the same manner as (2) of Example 2 were added to produce the catalyst system, to which 25 ml. of liquefied butadiene were added, and the polymerization were carried out according to the same condition as Example 1. The results of the experiments were as follows:

| Test No. | Nickel-diatomaceous earth (gr.) | Polymerization time (min.) | Polymer yield (gr.) | Microstructure (percent) | | |
|---|---|---|---|---|---|---|
| | | | | cis-1,4 | trans-1,4 | Vinyl |
| 1 | 0.2 | 120 | 0.7 | 86 | 10 | 4 |
| 2 | 0.5 | 120 | 6.9 | 91 | 7 | 2 |
| 3 | 1.0 | 120 | 9.5 | 90 | 5 | 5 |
| 4 | 2.0 | 100 | 9.0 | 91 | 5 | 4 |
| 5 | 3.0 | 100 | 12.2 | 90 | 5 | 5 |
| 6 | 4.0 | 100 | 12.0 | 90 | 5 | 5 |

Examples 6–14

In the similar method to manufacutre reduced nickel-diatomaceous earth to be used as a catalyst for the ordinary hydrogenation, basic nickel carbonate was precipitated together with diatomaceous earth by mixing nickel nitrate with sodium carbonate, and after being washed with water and dried, it was reduced by contacting with hydrogen at 350° C. for 5 hours. Reduced nickel-diatomaceous earth thus obtained was dark grey powders containing 10% nickel.

While purified nitrogen was flashed into a pressure bottle, 60 ml. of purified benzene was supplied in it and a given quantity of the above described nickel-diatomaceous earth was dispersed therein and a given quantity of borontrifluoride ether complex and a given quantity of triethylaluminum were added at room temperature successively to produce the catalyst system.

Then 25 ml. of liquefied butadiene was supplied into the bottle, and it was tightly sealed and agitated by revolving the bottle at 40 r.p.m. in a thermostat at 40° C. for a given time. The polymer thus obtained was completely dissolved in benzene and after suitably diluted solid catalyst was removed by a centrifuge and the solution was poured in methanol to which some antioxidant had been added. The precipitated polymer was dried in vacuo at room temperature, then transparent rubbery solid polymers were obtained. The microstructure was analyzed by the Morero method and the intrinsic viscosity was measured as a toluene solution at 25° C.

The gel content of these polymers was measured by filtering their toluene solution with 200 meshes copper wire gauze.

| Example No. | Nickel-diatomaceous earth (gr.) | Borontrifluoride ether (mmol.) | Triethylaluminum (mmol.) | Polymerization time (min.) | Purified polymer yield (gr.) |
|---|---|---|---|---|---|
| 6 | 5.0 | 2.0 | 2.0 | 105 | 8.8 |
| 7 | 3.0 | 2.0 | 2.0 | 70 | 6.3 |
| 8 | 2.0 | 2.0 | 2.0 | 105 | 8.7 |
| 9 | 1.0 | 2.0 | 2.0 | 105 | 6.9 |
| 10 | 0.5 | 1.0 | 1.0 | 105 | 9.3 |
| 11 | 1.0 | 2.0 | 1.0 | 300 | 6.1 |
| 12 | 1.0 | 2.0 | 4.0 | 70 | 9.5 |
| 13 | 2.0 | 1.0 | 2.0 | 70 | 7.2 |
| 14 | 2.0 | 4.0 | 2.0 | 70 | 7.5 |

| Example No. | Microstructure (percent) | | | Intrinsic viscosity [η] | Gel content (percent) |
|---|---|---|---|---|---|
| | cis-1,4 | trans-1,4 | Vinyl | | |
| 6 | 97.4 | 1.7 | 0.9 | 4.41 | 0 |
| 7 | 97.7 | 1.9 | 0.4 | 4.12 | 0 |
| 8 | 97.7 | 1.9 | 0.4 | 4.90 | 0 |
| 9 | 98.3 | 1.5 | 0.2 | 4.83 | 0 |
| 10 | 98.1 | 1.5 | 0.4 | 4.82 | 0 |
| 11 | 98.1 | 1.7 | 0.3 | 3.18 | 0 |
| 12 | 97.0 | 1.4 | 1.6 | 2.90 | 0 |
| 13 | 97.1 | 1.3 | 1.6 | 3.54 | 0 |
| 14 | 97.2 | 2.1 | 0.7 | 2.17 | 0 |

Examples 15–16

(A) 1.0 gr. of reduced nickel-diatomaceous earth manufactured by the same method as Example 6 was dispersed in 60 ml. of benzene and added with 2.0 mmol. of borontrifluoride ether complex and then added with 2.0 mmol. of triethylaluminum to form the catalyst system and afterwards 25 ml. of liquefied butadiene were poured in.

(B) Different from A, at first, 2.0 mmol. of borontrifluoride ether complex were dissolved in 60 ml. of benzene and then 2.0 mmol. of triethylaluminum were added thereto and after they reacted was added thereto 1.0 gr. of reduced nickel-diatomaceous earth to manufacture the catalyst system. The method of polymerization, other than described above, was the same as in Example 6.

| Example No. | Adding order | Polymeri- zation time (hr.) | Polymer yield (gr.) | Microstructure (percent) | | | Intrinsic viscosity [η] |
|---|---|---|---|---|---|---|---|
| | | | | cis-1,4 | trans-1,4 | Vinyl | |
| 15 | (A) | 5.0 | 11.4 | 98.3 | 1.6 | 0.1 | 4.83 |
| 16 | (B) | 5.0 | 2.1 | 97.9 | 1.9 | 0.2 | 4.75 |

*Examples 17–18*

Instead of mixing the catalyst components at room temperature to prepare the catalyst as in Examples 6 to 14, at first borontrifluoride ether complex was added to reduced nickel-diatomaceous earth dispersed in benzene and the mixture was heated at 40° C. for 1 hour and then it was cooled to the room temperature and added with triethylaluminum. The catalyst thus produced had considerably increased polymerization activity against those of without heat treatment. Except the above described matters all others were the same as in Examples 6 to 14.

| Example No. | Nickel-dia- tomaceous earth (gr.) | Borontri- fluoride ether (mmol.) | Triethyl- aluminum (mmol.) | Benzene (ml.) | Liquefied butadiene (ml.) |
|---|---|---|---|---|---|
| 17 | 0.2 | 1.0 | 1.0 | 60 | 25 |
| 18 | 0.2 | 1.0 | 1.0 | 120 | 60 |

| Example No. | Polymeri- zation time (min.) | Polymer yield (gr.) | Microstructure (percent) | | | Intrinsic viscosity [η] |
|---|---|---|---|---|---|---|
| | | | cis-1,4 | trans-1,4 | Vinyl | |
| 17 | 70 | 11.7 | 97.2 | 1.9 | 0.9 | 4.36 |
| 18 | 240 | 26.2 | 97.6 | 1.8 | 0.6 | 4.25 |

*Example 19*

0.4 gr. of finely powdered nickel formate put in a small amount of paraffin was heated to 220° C. in vacuum quartz tube and then it was reductively decomposed to yield a colloidal nickel. This was dispersed in 60 ml. of benzene and added with 1.5 mmol. of borontrifluoride ether complex and after being heated to 40° C. for 1 hour the reaction mixture was cooled to room temperature and 1.5 mmol. of triethylaluminum was added therein to produce the catalyst system. 30 ml. of liquefied butadiene were poured in the botle and polymerized at 40° C. for 15 hours.

After purifying in the similar manner to Examples 6 to 14, 15.0 gr. of rubbery solid polymer were obtained. The analysis of microstructure showed 98.2% cis-1,4, 1.4% trans-1,4 and 0.5% vinyl configurations, and the intrinsic viscosity was 3.52 and no gel was contained.

*Example 20*

According to the same method as the reduced nickel-diatomaceous earth (refer to Example 2 (1)), reduced cobalt-diatomaceous earth containing 50% of cobalt was produced from cobalt nitrate. 0.3 gr. of the reduced cobalt was dispersed in 60 ml. of benzene and 2.0 mmol. of borontrifluoride ether complex were added thereto and they were heated at 40° C. for 1 hour and after being cooled to room temperature, 2.0 mmol of triethylaluminum were added thereto to form the catalyst. Then 25 ml. of liquefied butadiene were added thereto and polymerized at 40° C. for 3 hours. After purifying and drying 4.0 gr. of rubbery polymer were obtained, which showed the microstructure of 91.9% cis-1,4, 1.4% trans-1,4 and 6.7% vinyl configurations and 3.05 of intrinsic viscosity.

*Examples 21–23*

1.0 gr. of reduced nickel-diatomaceous earth (nickel content of 10%) manufactured by the same method as Examples 6 to 14 was dispersed in 60 ml. of benzene and 2.0 mmol. of borontrifluoride ether complex were added thereto and they were heated at 40° C. for 1 hour and after being cooled at room temperature butyllithium, diethylcadmium or tetrabutyltin as another example of organometallic compound belonging to C component was added thereto to form the catalyst. 25 ml. of liquefied butadiene were added to the catalyst and the polymerization was effected at 40° C.

| Example No. | C Component | Polymeri- zation time (hr.) | Polymer yield (gr.) | Microstructure Percent | | |
|---|---|---|---|---|---|---|
| | | | | cis-1,4 | trans-1,4 | Vinyl |
| 21 | Butyllithium 2.0 mmol | 6.0 | 6.0 | 95.7 | 3.2 | 1.1 |
| 22 | Diethylcadmium 2.0 mmol | 6.0 | 5.4 | 92.3 | 5.9 | 1.8 |
| 23 | Tetrabutyltin 3.0 mmol | 24.0 | 4.8 | 90.2 | 8.1 | 1.7 |

*Examples 24–25*

As the example of metal halides for the C component, powdered calcium hydride or lithiumaluminum hydride was used and the experiments were carried out under the same condition as Examples 21 to 23.

| Example No. | C Component | Polymeri- zation time (hr.) | Polymer yield (gr.) | Microstructure Percent | | |
|---|---|---|---|---|---|---|
| | | | | cis-1,4 | trans-1,4 | Vinyl |
| 24 | Calcium hydride 1.0 gr | 2.0 | 4.5 | 90.7 | 7.9 | 1.4 |
| 25 | Lithiumaluminum hydride 1.0 gr. | 2.0 | 3.5 | 88.2 | 9.7 | 2.1 |

*Examples 26–27*

A solution of 148.1 gr. of $Co(NO_3)_2 \cdot 6H_2O$ dissolved in 250 ml. of water was added to 30 gr. of diatomaceous earth and a solution of 10% $NaHCO_3$ of 1.5 times of the calculated amount was added dropwise while stirring, then cobalt carbonate thus produced was precipitated on diatomaceous earth and the solid substances were filtered, subsequently being washed with water until the filtrate arrives to pH 7. After drying the cobalt carbonate-diatomaceous earth, it was thermally decomposed at 400° C. while passing air.

Then the thermally decomposed substance was reduced at 480° C. by passing hydrogen for 3 hours. The reduced cobalt-diatomaceous earth thus obtained had black color and contained about 50% of cobalt.

To a pressure bottle having inner volume of 280 ml. were added a given quantity of reduced cobalt-diatomaceous earth, 40 ml. of refined benzene dried by metallic sodium, a given quantity of titanium tetrachloride and triethylaluminum at room temperature in the order as described while flushing dry refined nitrogen. Then 25 ml. of liquid butadiene which was dried by caustic potash and calcium chloride and then dehydrated by cooling to −78° C. was poured in the pressure bottle, and the bottle was sealed. After the bottle had been rotated for a given period at 40 r.p.m. in the thermostat maintaining 40° C., the bottle was opened to expel unreacted butadiene. After a further suitable amount of benzene was added to the pressure bottle and it was well shaked and left still, the solid portion of the catalyst was coagulated and precipitated. The supernatant liquid from which was removed the suspended solids thoroughly by a centrifuge was poured into a large amount of methanol containing an antioxidant. The precipitate was taken out and dried in vacuo at room temperature to obtain the polymer. The polymer thus obtained was dissolved in carbon disulfide and the microstructure was analyzed by means of infrared spectrometer.

| Example No. | Reduced cobalt-diatomaceous earth (gr.) | Titanium-tetrachloride (mmol.) | Triethyl aluminum (mmol.) | Polymerization time (hr.) | Polymer yield (gr.) |
|---|---|---|---|---|---|
| 26 | 3.3 | 2.0 | 0.8 | 22.0 | 3.5 |
| 27 | 3.3 | 2.0 | 2.0 | 6.5 | 2.6 |

| Example No. | Microstructure (percent) | | | Appearance of Polymer |
|---|---|---|---|---|
| | cis-1,4 | trans-1,4 | Vinyl | |
| 26 | 78.4 | 20.3 | 1.3 | A little elastic solid. |
| 27 | 92.3 | 6.6 | 1.0 | Elastic solid. |

*Example 28*

0.7 g. of reduced cobalt-diatomaceous earth manufactured in Example 26, 40 ml. of benzene, 0.4 mmol. of titaniumtetrachloride, 1 mmol. of triethylaluminum were fed in a pressure bottle cooled to −50° C. in the order as described to obtain the catalyst. Then 25 ml. of liquid butadiene were poured in the bottle and the latter was tightly sealed, the polymerization being effected for 2 hours at 40° C. while rotating and stirring the bottle at 40 r.p.m. After being dried 3.4 gr. of the solid rubbery polymer were obtained. As a result of infrared spectral analysis the microstructure of the polymer showed 89.2% cis-1,4, 5.0% trans-1,4 and 5.8% vinyl configurations.

*Example 29*

0.9 gr. of commercial cobalt naphthenate (cobalt content 10%) was dissolved in 40 ml. of benzene and the solution was poured into a presure bottle, then 2 mmol. of triethylaluminum were added thereto at room temperature and the mixture was well shaked to produce colloidal black reduced cobalt. To this were added 2 mmol. of titaniumtetrachloride to form the catalyst. Then 25 ml. of liquid butadiene were poured into the bottle and it was tightly sealed. The polymerization was effected for 5 hours at 40° C. while rotating and stirring the bottle at 40 r.p.m. After being dried 5.8 gr. of rubbery solid polymer were obtained. The result of infrared spectral analysis showed the polymer contained 91.0% cis-1,4, 4.2% trans-1,4 and 4.8% vinyl configurations.

*Example 30*

The catalyst was obtained by using 1.1 gr. of commercial cobalt octanoate (cobalt content 8%) instead of cobaltnaphthenate in the same manner as Example 29. The polymerization was effected by the catalyst. The rubbery solid polymer was obtained. Yield 4.6 gr. As the result of infrared spectral analysis, the polymer showed 90.5% cis-1,4, 5.6% trans-1,4 and 3.9% vinyl configurations.

*Example 31*

1.0 gr. of commercial manganesenaphthenate (content of manganese 10%) was dissolved in 40 ml. of benzene and the solution was poured into a pressure bottle, to which 6 mmol. of triethylaluminum were added at room temperature, but there was no change. The pressure bottle was tightly sealed and dipped into a thermostat at 90° C. and heated for 40 minutes to produce colloidal black manganese. To this colloid were added 1.5 mmol. of titaniumtetrachloride to obtain the catalyst. Then 25 ml. of liquid butadiene were poured therein and the polymerization was effected for 17.5 hours at 40° C. while rotating and stirring the bottle at 40 r.p.m. The solid polymer was obtained. Yield 3.8 gr. As the result of infrared spectral analysis, the microstructure showed 80.6% cis-1,4, 15.6% trans-1,4 and 3.8% vinyl configurations.

*Example 32*

Ferrous oxalate was reduced at 375° C. for three hours by passing hydrogen and the reduced iron thus obtained was black powders.

To a pressure bottle cooled to −50° C. were fed 40 ml. of benzene, 0.35 gr. of reduced iron, 0.4 mmol. of titaniumtetrabromide and 1 mmol. of triethylaluminum in the order as described, while flushing purified nitrogen, to obtain the catalyst. To the catalyst were added 25 ml. of liquid butadiene and the polymerization was effected for 24 hours at 40° C. while rotating and stirring the bottle at 40 r.p.m. The solid polymer was obtained. Yield 3.0 gr. As the result of infrared spectral analysis, the microstructure showed 86.1% cis-1,4, 8.1% trans-1,4 and 5.8% vinyl configurations.

*Example 33*

Platinized asbestos (platinum content 20%) manufactured by known method was dried by heating at 110° C. for 5 hours. 2 gr. of said platinized asbestos, 40 ml. of toluene, 1 mmol. of titaniumtetrabromide and 1 mmol. of triethylaluminum were fed into a pressure bottle cooled to −50° C. while flushing purified nitrogen in the order as described to obtain the catalyst. To this bottle were poured 25 ml. of liquid butadiene and the polymerization was effected for 20 hours at 40° C. while rotating and stirring the bottle at 40 r.p.m. The solid polymer was obtained. Yield 2.0 gr. As the result of infrared spectral analysis, the microstructure showed 80.7% cis-1,4, 15.4% trans-1,4 and 3.9% vinyl configurations.

*Examples 34–36*

According to generally similar method to usually used method of developing Raney iron, 50 gr. of iron-aluminum alloy power (iron content of 33.1%, grain size: under 200 mesh) were fed in 254 ml. of 20% aqueous solution of caustic soda little by little for 50 minutes with regulating the temperature of the solution at 50° C. and then the temperature of the solution was raised to 80±2° C. and left to react for 1 hour. The supernatant alkali solution was let flow out by decantation and the metal was added with 254 ml. of fresh 20% caustic soda solution and reacted therewith at 80±2° C. for 1 hour. Taking care not to expose the surface of the metal to air, Raney iron thus obtained was washed with water and then dehydrated by substituting water with anhydrous ethanol and further after substituting ethanol with anhydrous benzene, then stored therein.

Order of adding the catalyst components (A): While passing refined nitrogen gas 50 ml. of anhydrous benzene were poured into a pressure bottle of 280 ml. of capacity and 1.5 mmol. of borontrifluoride ether complex, 1.2 mmol. of triethylaluminum and about 0.3 gr. of said Raney iron were added in this order and 20 ml. of refined liquefied butadiene were added in the bottle and polymerized for 2.5 hours at 40° C. with stirring. The polymer solution containing the catalyst was diluted with benzene containing a small amount of methanol and centrifuged to remove solid part in the catalyst, then it was poured into a large amount of methanol to precipitate the polymer. The polymer was dried in vacuo at room temperature and was analyzed as a carbon disulfide solution with infrared absorption spectrum. The intrinsic viscosity was measured in toluene at 25° C. with Ostwald viscometer.

Order of adding the catalyst components (B): Except the addition of the catalyst components were in the order of Raney iron, borontrifluoride ether complex and triethylaluminum, all other treatments and polymerization conditions were same as (A).

Order of adding the catalyst components (C): Except the addition of the catalyst components were in the order of Raney iron, triethylaluminum, borontrifluoride ether complex, all other treatments and polymerization conditions were same as (A).

The polymers were rubbery solids soluble in benzene and contained no gel. The next table shows the results:

| Example No. | Order of adding the catalyst components | Polymer yield (gr.) | Microstructure (percent) | | | $[\eta]$ 25° C. toluene |
|---|---|---|---|---|---|---|
| | | | cis-1,4 | trans-1,4 | Vinyl | |
| 34 | A | 5.2 | 95.2 | 2.9 | 1.9 | 4.63 |
| 35 | B | 6.3 | 95.5 | 2.7 | 1.8 | 4.62 |
| 36 | C | 2.8 | 96.1 | 2.7 | 1.2 | 4.42 |

*Examples 37–41*

While passing purified nitrogen gas 60 ml. of anhydrous benzene were poured in a pressure bottle having 280 ml. of capacity and then 1.5 mmol. of borontrifluoride ether complex, triethylaluminum (0.75 mmol. to 1.95 mmol.) and about 0.3 gr. of said Raney iron were added in this order (according to the order (A)) and also 30 ml. of purified liquefied butadiene were poured in the bottle and polymerized at 40° C. with stirring. The method of treatment of polymers was carried out same as in Example 34. Polymers thus obtained were rubbery solids and contained no gel. The results are shown in next table.

| Example No. | AlEt₃ (mmol.) | AlEt₃: BF₃OEt₂ (mole ratio) | Polymerization time (hr.) | Polymer yield (gr.) | Microstructure (percent) | | |
|---|---|---|---|---|---|---|---|
| | | | | | cis-1,4 | trans-1,4 | Vinyl |
| 37 | 0.75 | 0.5 | 21.8 | 2.0 | 95.1 | 3.4 | 1.5 |
| 38 | 1.20 | 0.8 | 2.5 | 6.0 | 96.9 | 2.0 | 1.0 |
| 39 | 1.35 | 0.9 | 2.5 | 5.5 | 96.0 | 2.4 | 1.6 |
| 40 | 1.65 | 1.1 | 2.5 | 3.5 | 96.7 | 1.8 | 1.5 |
| 41 | 1.95 | 1.3 | 2.5 | 1.3 | 94.2 | 3.8 | 2.0 |

*Examples 42–45*

While passing purified nitrogen gas 60 ml. of anhydrous benzene were put in a pressure bottle of 280 ml. and then 1.5 mmol. of borontrifluoride ether complex, 1.2 mmol. of triethylaluminum and said Raney iron (about 0.1 gr. to 0.5 gr.) were mixed in this order (the order (A)), then 30 ml. of refined liquefied butadiene were poured in the bottle and polymerized for 2 hours at 40° C. with stirring.

The method of treatment of polymers was same as in Example 34. The polymers thus obtained were rubbery solids and contained no gel. The results are shown in next table.

| Example No. | Raney-iron (gr.) | Polymer yield (gr.) | Microstructure (percent) | | |
|---|---|---|---|---|---|
| | | | cis-1,4 | trans-1,4 | Vinyl |
| 42 | 0.1 | 0.6 | 95.9 | 2.7 | 1.5 |
| 43 | 0.2 | 4.0 | 96.7 | 2.2 | 1.1 |
| 44 | 0.3 | 8.6 | 96.7 | 2.1 | 1.2 |
| 45 | 0.5 | 9.1 | 97.2 | 1.9 | 0.9 |

*Example 46*

Except using 120 ml. of anhydrous benzene, 60 ml. of liquefied butadiene and the time of polymerization of 5 hours, the quantity of catalyst, the order of adding the catalyst components and the method of polymerization were same as in Example 34. Polymer thus obtained was rubbery solid and contained no gel. The results are as follows:

Polymer yield _____ gr__ 23.3
Microstructure:
  Cis-1,4 _____ percent__ 96.5
  Trans-1,4 _____ do____ 2.0
  Vinyl _____ do____ 1.5

*Examples 47–49*

10 gr. each of three kinds of iron-aluminum alloy powders (grain size: under 200 mesh) containing 40%, 45% or 50% of iron respectively were put little by little in 100 ml. of 20% caustic soda solution while regulating the temperature of the solution at 50° C. for about 30 minutes, then the temperature of the solution was raised to 80° C. and left at 80° C. for 5 minutes. Raney iron thus obtained was washed with water and dehydrated according to the same manner as in Example 34 and stored in anhydrous benzene.

According to the same manner as Example 34, 20 ml. of benzene, 2.5 mmol. of borontrifluoride ether complex and 2 mmol. of triethylaluminum and about 0.5 gr. of said Raney iron were added according to the order (A) and using 20 ml. of refined purified butadiene the polymerization was effected at room temperature (25 to 27° C.) for three hours. The polymer thus obtained was rubbery solids and contained no gel. The results are shown in the next table.

| Example No. | Fe-Al alloy Fe content (percent) | Polymer yield (gr.) | Microstructure (percent) | | |
|---|---|---|---|---|---|
| | | | cis-1,4 | trans-1,4 | Vinyl |
| 47 | 40 | 3.8 | 98.3 | 0.9 | 0.8 |
| 48 | 45 | 4.5 | 98.3 | 0.9 | 0.8 |
| 49 | 50 | 1.5 | 98.4 | 1.1 | 0.5 |

*Examples 50–52*

Each 10 gr. of iron-aluminum alloy powders (under 200 meshes) containing 45% of iron were developed in the same manner as in Example 47 except changing the developing time at 80° C. to 5 minutes, 1 hour, and 2 hours and three different kinds of Raney iron were obtained. The polymerization was effected under the same condition as in Example 47 except 40 ml. of benzene were used. The polymers thus obtained were rubbery solids and no gel was formed. The results are shown in the next table.

| Example No. | Time of developing alloy | Polymer yield (gr.) | Microstructure (percent) | | |
|---|---|---|---|---|---|
| | | | cis-1,4 | trans-1,4 | Vinyl |
| 50 | 30 min. at 50° C. 5 min. at 80° C. (later). | 2.8 | 98.8 | 0.5 | 0.6 |
| 51 | 30 min. at 50° C. 1 hr. at 80° C. (later). | 6.3 | 98.8 | 0.7 | 0.5 |
| 52 | 30 min. at 50° C. 2 hrs. at 80° C. (later). | 9.5 | 97.7 | 1.1 | 1.2 |

*Examples 53–55*

Iron-nickel-aluminum alloy powders (27.8% iron, 2.4% nickel and the remaining aluminum, under 200 meshes) were developed under the same condition as Raney iron in Example 34 and stored in anhydrous benzene.

By using 30 ml. of anhydrous benzene, 30 ml. of refined liquefied butadiene, 2.5 mmol. of borontrifluoride ether complex, 2 mmol. of triethylaluminum and about 0.5 gr. of said Raney iron-nickel the polymerizations were effected about three kinds of the order (A), (B) and (C) of adding the catalyst components according to the same process of Examples 34 to 36. The polymers thus obtained were rubbery solids and no gel was formed. The results are shown in the next table.

| Example No. | Order of adding the catalyst components | Polymerization time (hr.) | Polymer yield (gr.) | Microstructure (percent) | | |
|---|---|---|---|---|---|---|
| | | | | cis-1,4 | trans-1,4 | Vinyl |
| 53 | A | 1.8 | 7.7 | 95.7 | 2.9 | 1.4 |
| 54 | B | 1.6 | 13.3 | 96.1 | 2.6 | 1.3 |
| 55 | C | 2.1 | 5.0 | 95.9 | 2.8 | 1.4 |

*Examples 56–58*

The catalyst was prepared according to the order (B) by using about 0.5 gr. of said Raney iron-nickel, 2.5 mmol. of borontrifluoride ether complex and 2.25 mmol. of triethylaluminum and the polymerizations were carried out for 2 hours according to the same method as Example 54 except the amount of butadiene and benzene were varied in three kinds. The results are shown in the next table.

| Example No. | Liquefied butadiene (ml.) | Benzene (mmol.) | Polymer yield (gr.) | Microstructure (percent) | | |
|---|---|---|---|---|---|---|
| | | | | cis-1,4 | trans-1,4 | Vinyl |
| 56 | 30 | 60 | 13.0 | 93.2 | 4.5 | 2.3 |
| 57 | 40 | 80 | 17.3 | 94.4 | 3.3 | 2.3 |
| 58 | 60 | 120 | 24.4 | 95.4 | 2.8 | 1.8 |

*Example 59*

Iron-aluminum alloy powders (under 200 meshes) containing 45% iron were developed according to the same process as Examples 47 to 49 (except the reaction time at 80° C. was 90 minutes) and Raney iron obtained was stored in anhydrous benzene. The Raney iron thus obtained had entirely no pyrophoric property even in the air.

20 ml. of anhydrous benzene, about 0.5 gr. of said Raney iron and 2 mmol. of triethylaluminum were put in a pressure bottle of 280 ml. of capacity while passing purified nitrogen gas, and borontrifluoride gas was bubbled into the said solution with stirring under the atmospheric pressure for 17 minutes (after 15 minutes the reaction system became whitely turbid) and 30 ml. of refined liquefied butadiene were poured in the bottle and the polymerization was carried out at room temperature. After about 25 minutes, the reaction system had entirely solidified, and after one hour the polymer was taken out and refined in the same manner as before. The polymer thus obtained was a rubbery solid and no gel formed. The yield of polymer and microstructure were as follows:

Polymer yield _____ gr__ 10.2
Microstructure:
   Cis-1,4 _____ percent__ 98.7
   Trans-1,4 _____ do____ 0.8
   Vinyl _____ do____ 0.6

*Examples 60–62*

By the same method as usually used for development of Raney nickel, 100 gr. of powders of nickel-aluminum alloy (48% nickel, grain size under 200 meshes) were developed in 508 ml. of 20% aqueous solution of caustic soda for 1 hour at 70° C. and after being washed with water Raney nickel obtained was dehydrated with anhydrous methanol and also after substituting methanol with anhydrous benzene, Raney nickel was stored in anhydrous benzene.

Order of adding the catalyst components (A): While passing purified nitrogen gas 60 ml. of refined benzene were put in a pressure bottle of 280 ml. and were added thereto 25 mmol. of borontrifluoride ether complex, 2 mmol. of triethylaluminum and about 0.5 gr. of said Raney nickel were added thereto in this order, and then 30 ml. of refined liquefied butadiene were poured into the bottle, and the polymerization was effected at 40° C. for 3 hours with stirring. The reaction mixture was diluted with benzene containing some antioxidant (phenyl-β-naphthylamin) and the solid parts of the catalyst were removed by a centrifuge and the polymer solution was poured into a methanol to precipitate the polymer. The product was dried in vacuo at room temperature and analyzed by infrared spectrum as a solution of carbon disulfide (the intrinsic viscosity was measured by Ostwald viscometer in toluene at 25° C.).

Order of adding the catalyst components (B): Except the addition of the catalyst components were in the order of Raney nickel, borontrifluoride ether complex and triethylaluminum, the same polymerization condition and the recipe as (A) were adopted.

Order of adding the catalyst components (C): Except the addition of the catalyst components were in the order of Raney nickel, triethylaluminum and borontrifluoride ether complex, the same recipe and polymerization condition as (A) were adopted. The results were as follows:

The polymers were rubbery solids and contained no gel.

| Example No. | Order of adding the catalyst components | Polymer yield (gr.) | Microstructure (percent) | | | 25° C. [η] toluene |
|---|---|---|---|---|---|---|
| | | | cis-1,4 | trans-1,4 | Vinyl | |
| 60 | A | 6.2 | 97.5 | 2.1 | 0.4 | 4.45 |
| 61 | B | 13.0 | 98.2 | 1.7 | 0.1 | 4.37 |
| 62 | C | 4.3 | 98.5 | 1.5 | 1 | 4.20 |

*Example 63*

While passing purified nitrogen gas 40 ml. of refined benzene were put in a pressure bottle having 280 ml. of capacity and 2.22 mmol. of borontrifluoride ether complex, 2 mmol. of diethylzinc and about 0.5 gr. of said Raney nickel were added in this order, and then 20 ml. of refined liquefied butadiene were poured in the bottle and polymerized for 4 days at room temperature and then the polymer was purified and treated in the same manner as before and the following results were obtained. Polymer was a rubbery solid and contained no gel.

Polymer yield _____ gr__ 7.8
Microstructure:
   Cis-1,4 _____ percent__ 97.5
   Trans-1,4 _____ do____ 1.8
   Vinyl _____ do____ 0.7
$[\eta]_{toluene}^{25°/C.}$ _____ 2.27

Example 64

While passing purified nitrogen gas 40 ml. of refined benzene were put in a pressure bottle of 280 ml. and 1.0 mmol. of titaniumtetrachloride, 1.0 mmol. of triethylaluminum and 0.25 gr. of said Raney nickel were added in this order and 20 ml. of purified liquefied butadiene were poured in the bottle and the polymerization was effected for 2.5 hours at 40° C. with stirring. The polymer was purified in the same way as before and 7.7 gr. of rubbery solid were obtained. The microstructure by infrared spectral analysis was as follows:

| | Percent |
|---|---|
| Cis-1,4 | 92.0 |
| Trans-1,4 | 4.1 |
| Vinyl | 3.9 |

Example 65

While passing purified nitrogen gas 50 ml. of refined benzene were put in a pressure bottle of 280 ml. and 1 mmol. of titaniumtetrachloride, 1 mmol. of butyllithium and about 0.25 gr. of said Raney nickel were added in this order, and 20 ml. of refined liquefied butadiene were poured in the bottle and the polymerization was effected for 23 hours at 40° C. with stirring. The polymer was purified in the same way as before and 6.2 gr. of rubbery solid were obtained. Microstructure by infrared spectral analysis and the intrinsic viscosity in toluene at 25° C. were as follows:

Microstructure:
- Cis-1,4 _____percent__ 94.5
- Trans-1,4 _____do____ 3.5
- Vinyl _____do____ 2.0

$[\eta]_{toluene}^{25°\ C.}$ _____ 1.66

Example 66

While passing purified nitrogen gas 30 ml. of refined benzene were put in a pressure bottle of 280 ml. and 0.5 mmol. of borontrifluoride ether complex, 2 mmol. of triethylboron and about 0.5 gr. of said Raney nickel were added in this order, and 20 ml. of refined liquefied butadiene were poured in the bottle and the polymerization was effected for 22 hours at 40° C. with stirring. The polymer was purified in the same way as before and 0.5 gr. of rubbery solid polymer was obtained. The microstructure of the polymer was as follows:

| Microstructure: | Percent |
|---|---|
| Cis-1,4 | 94.1 |
| Trans-1,4 | 5.4 |
| Vinyl | 0.5 |

Example 67

By the similar method to the method of development of Raney cobalt as usually used 100 gr. of powder of cobalt-aluminum alloy (45% cobalt, grain size under 200 meshes) were developed in 508 ml. of 20% aqueous soluiton of caustic soda for 1 hour at 50° C. After being washed, dehydrated and dealcoholized in the same manner as said Raney nickel, Raney cobalt thus obtained was stored in anhydrous benzene.

While passing purified nitrogen gas 60 ml. of refined benzene were put in a pressure bottle of 280 ml. and about 0.5 gr. of said Raney cobalt, 2 mmol. of boron- trifluoride ether complex and 2 mmol. of triethylaluminum were added in this order, and after 30 ml. of refined liquefied butadiene were poured in the bottle and the polymerization was carried out while maintaining the bottle still for 18.5 hours at 40° C. After refining the polymer in the same manner as before, 1.8 gr. of rubbery solid was obtained. The microstructure by infrared spectral analysis was as follows:

| Microstructure: | Percent |
|---|---|
| Cis-1,4 | 92.4 |
| Trans-1,4 | 2.2 |
| Vinyl | 5.4 |

What we claim is:

1. A process for manufacturing cis-1,4 polybutadiene, which comprises polymerizing butadiene in liquid phase at a temperature between —50° C., and 150° C., under a pressure sufficient to maintain the reaction system in liquid phase and in an inert atmosphere to a solid polymer having a high content of cis-1,4 configuration and substantially no gel by using a catalyst essentially consisting of (A) metallic nickel having a large surface area for its weight, (B) boron trifluoride etherate, and (C) trialkyl aluminum; the mol ratio of the (C) component to the (B) component being between about 0.1 to about 5; and the amount of (A) component being about 0.1 to about 10 gram atoms per 1 mol of (B) component.

2. A process according to claim 1, wherein said metallic nickel is supported on a carrier selected from the group consisting of diatomaceous earth, silica-alumina, silica, alumina, titania, zirconia, active clay and kaolin.

3. A process according to claim 1 wherein said metallic nickel is a Raney nickel.

4. A process according to claim 1 wherein said boron trifluoride etherate is boron trifluoride ethyl etherate.

5. A process according to claim 1, wherein said trialkyl aluminum is triethyl aluminum.

References Cited by the Examiner

UNITED STATES PATENTS

| 2,882,264 | 4/59 | Barnes | 260—94.9 |
| 2,931,792 | 4/60 | Aries | 260—93.5 |
| 2,933,485 | 4/60 | D'Alelio | 260—94.9 |
| 2,981,726 | 4/61 | Gordon | 260—93.7 |
| 3,008,943 | 11/61 | Guyer | 260—94.9 |
| 3,031,441 | 4/62 | Verheyden et al. | 260—94.3 |
| 3,032,544 | 5/62 | Longiave et al. | 260—94.3 |
| 3,049,526 | 8/62 | D'Alelio | 260—94.3 |
| 3,066,126 | 11/62 | Porter et al. | 260—94.3 |
| 3,066,127 | 11/62 | Carlson et al. | 260—94.3 |

FOREIGN PATENTS

| 578,156 | 10/59 | Belgium. |
| 837,251 | 6/60 | Great Britain. |
| 1,215,953 | 11/59 | France. |

OTHER REFERENCES

Advanced Organic Chem., G. W. Wheland, J. Wiley & Sons, Inc. (1949), page 80 relied on.

Catalysis, P. H. Emmett. Reinhold Publ. Corp., New York, 1954, vol. 1, pages 245, 246, and 334–337.

JOSEPH L. SCHOFER, *Primary Examiner.*

L. H. GASTON, WILLIAM H. SHORT, *Examiners.*